US009400768B2

(12) United States Patent
Lundgren (10) Patent No.: US 9,400,768 B2
(45) Date of Patent: Jul. 26, 2016

(54) METHODS, SYSTEMS, ALGORITHMS, SIGNAL PROCESSING MEANS AND DEVICES FOR DETECTING THE TREACLE MASS SLUG CREATED BY A SHOCK WAVE AND DETERMINATION OF THE DYNAMIC PRESSURE, DENSITY, VELOCITY AND CONDUCTIVITY BY ALFÉN WAVE IDENTIFICATION

(71) Applicant: Ronald G. Lundgren, Littleton, CO (US)

(72) Inventor: Ronald G. Lundgren, Littleton, CO (US)

( * ) Notice: Subject to any disclaimer, the term of this patent is extended or adjusted under 35 U.S.C. 154(b) by 660 days.

(21) Appl. No.: 13/916,060

(22) Filed: Jun. 12, 2013

(65) Prior Publication Data
US 2013/0262005 A1    Oct. 3, 2013

(51) Int. Cl.
*G01R 19/00* (2006.01)
*H02K 44/00* (2006.01)
*G06F 17/11* (2006.01)
*H02K 44/10* (2006.01)
*H02K 44/12* (2006.01)
*H02K 44/20* (2006.01)
*H02K 44/08* (2006.01)

(52) U.S. Cl.
CPC .............. *G06F 17/11* (2013.01); *H02K 44/08* (2013.01); *H02K 44/10* (2013.01); *H02K 44/12* (2013.01); *H02K 44/20* (2013.01)

(58) Field of Classification Search
CPC ....... H02K 44/04; H02K 44/08; H02K 44/10; H02K 44/12; H02K 44/20; H02K 44/24; H02K 44/00; H02K 44/16
USPC ................... 702/57, 64, 65; 307/106; 310/11
See application file for complete search history.

(56) References Cited

U.S. PATENT DOCUMENTS

| | | | |
|---|---|---|---|
| 3,080,515 A | 3/1963 | Kehoe | |
| 3,214,615 A | 10/1965 | Way | |
| 3,311,762 A | 3/1967 | Croitoru | |
| 3,603,822 A | 9/1971 | Petsinger | |
| 4,134,034 A | 1/1979 | Dardai et al. | |
| 4,846,066 A | 7/1989 | Beattie et al. | |
| 5,445,690 A | 8/1995 | Wulfman | |
| 6,982,501 B1 * | 1/2006 | Kotha | B82Y 25/00 310/10 |
| 8,217,537 B2 | 7/2012 | Bright | |
| 2012/0032526 A1 | 2/2012 | Lundgren | |

OTHER PUBLICATIONS

Agee, Baca, Dhama, Lehr, Englert, Gaudet, Shiffler, Vigil, Kaye. Experimental Studies of Explosively Driven Magnetohydrodynamic Generators.
Vigil Sandia National Laboratories. Explosively-Driven Magnetohydrodynamic (MHD) Generator Studies, Kirtland AFB, NM 87117-5000.

* cited by examiner

Primary Examiner — An Do (57) ABSTRACT

Methods, systems, algorithms and signal processing devices for determining the dynamic variables of pressure, density, velocity and conductivity of a generated mass slug, known as the Treacle and formed in a shock discontinuity produced by explosive detonation, deflagration or nature, are provided herein. The parameter determination is based on the discovery of the existence of a Treacle formed in the reaction zone of a shock wave. This verbal noun describes the action of changing the kinetic energy (treacling) of a mass slug immersed and traveling through a magnetic field thereby generating a detectable Alfvén wave, which is measured and with an algorithm yields the Treacle dynamic variables. The information is further used to devise methods and systems that utilize the information to create shock shields and high power devices or any other electrically powered transmission disposed within an electrical load.

1 Claim, 9 Drawing Sheets

METHODS, SYSTEMS, ALGORITHMS, SIGNAL PROCESSING MEANS AND DEVICES FOR DETECTING THE TREACLE MASS SLUG CREATED BY A SHOCK WAVE AND DETERMINATION OF THE DYNAMIC PRESSURE, DENSITY, VELOCITY AND CONDUCTIVITY BY ALFÉN WAVE IDENTIFICATION

TECHNICAL FIELD

The present specification generally relates to the methods, systems, algorithms, signal processing means and devices for detecting a slug of mass called the Treacle formed by a shock wave's discontinuity and, more specifically, to methods, systems, algorithms, signal processing means and devices for determining its physical parameters, pressure, density, velocity and conductivity, and the beneficial applications of these parameters.

BACKGROUND

Presently Magnetogas- or Magnetohydro-dynamics (MGD or MHD) electrical generation, patents and applications use conditioned fluids. That is the working fluid traveling down a magnetic flux filled channel is forced into a state of ionization and conductivity by means such as seeding (the addition or treating of one material with more readily ionized material) or by an a priori selection of naturally or readily conductive fluids such as Mercury or Hydrogen Peroxide. This invention utilizes the discovery of a mass slug or Treacle, formed within the reaction zone of a shock wave's discontinuity independent of any fluid conditioning and utilizes its beneficial effect of electrical generation during confined transit down a flux filled channel. A shock wave's leading edge will cooperate with the material in front of it to form a slug of mass called the Treacle. This slug of mass is frequently applied to various applications such as military weapons. A shock wave's leading edge is a discontinuity. It is a rapid rise from one state of environmental conditions of pressure, temperature, density, and velocity to yet another higher state. Its thickness is expressed in Mean Free Paths or the average distance traveled by a moving particle such as an atom or molecule between successive collisions and not currently a directly measurable quantity. For example, a Treacle applied to the human body will rupture ear drums, collapse chest cavities and destroy brain cells or otherwise re-arrange the neurons. Mechanical and electrical equipment is especially sensitive to a Treacle and results in cessation of the equipment's mission. Shields to prevent biological or mechanical damage typically comprise robust and massive deflectors. The deflectors may be pre-emplaced heavy blast doors made of concrete, steel, or other shock absorbing materials. Such blast doors are themselves subject to damage when utilized to deflect a Treacle. Additionally, due to their size and weight, heavy blast shields deploy slowly relative to the propagation rate of a Treacle generated by an explosive event.

In addition to deflecting a Treacle, it is desirable to intentionally generate the Treacle and utilize the Treacle as an energy source in lieu of other energy sources. For example, capacitors may convert electrical energy stored in batteries to high power microwave energy. The high power microwave energy may be utilized in various high power microwave systems such as, for example, radar imaging, communications, radar detection and weapons that disable equipment and electronic devices. However, the batteries commonly require a large volume to produce enough power for the effective operation of the high power microwave systems. Effective operation may be facilitated by producing the necessary amount of power with a volume of explosive material that is several orders of magnitude smaller than the volume of the batteries by dissipating the energy of a Treacle generated by the explosive material with an electrical load.

Accordingly, a need exists for methods, systems, algorithms, signal processing means and devices for determining the macroscopic makeup of an ionized (conductive) Treacle, a slug of mass, in order to evaluate it and apply it to military and industrial hardware and power generation applications.

SUMMARY

In the preferred embodiment, an algorithmic method of determining pressure, density, velocity, conductivity, length, and impulse of a Treacle formed in the reaction zone of a shock wave may include: applying a magnetic flux across a shock wave disposed within a channel, wherein the channel includes substantially constant dimensions as the Treacle containing shock wave enters the channel; interacting with stored electromagnetic energy and transforming kinetic energy from the Treacle to electrical energy; applying a high potential electrode to the electrical energy; applying a low potential electrode to the electrical energy; and coupling an electrical load conductively with the high potential electrode and the low potential electrode to a recording device such as an oscilloscope, thereby detecting the Alfén wave contained within the measured pulse and applying the algorithm to extract the dynamic formation information and Treacle properties and further utilizing said dynamic properties to devise beneficial methods and systems such as shock shields and high power devices.

In another embodiment, a method for determining and utilizing the properties of a Treacle and controlling its dissipation or enhancement may include: an electronic control unit including a processor and an electronic memory; a magnetic flux filled channel of substantially constant dimensions enclosing a Treacle containing fluid; a high potential electrode in contact with the fluid, wherein the high potential electrode includes an initiation surface; a low potential electrode in contact with the fluid, wherein the low potential electrode includes a termination surface facing the initiation surface; an electrical load conductively coupled to the high potential electrode and the low potential electrode; all communicatively coupled to the electronic control unit. The electronic control unit executes machine readable instructions, implements the algorithm, and generates a matching load across a shock wave Treacle propagating with the fluid, such that the electric field between the initiation surface and the termination surface is power maximized or signals for a change in the electric or magnetic flux to modulate the Treacle kinetic energy.

In yet another embodiment, a method for utilization of the properties of a Treacle to further the control of its dissipation or enhancement may include: a segmented or non-constant dimensional channel with variations pre-defined enclosing the fluid; a high potential electrode in contact with the fluid; a low potential electrode in contact with the fluid; a load and recording device conductively coupled to the high potential electrode and the low potential electrode connected to a load; a north pole magnetic source coupled to the channel, wherein the north pole magnetic source includes a flux directing surface that faces the fluid; a south pole magnetic source disposed across from and substantially parallel to the north pole magnetic source, wherein a magnetic flux direction is substantially normal to the flux directing surface and substantially orthogonal to the direction of propagation; and an explosive, wherein a Treacle within a shock wave is detected and propagates along the direction of propagation upon a detonation of the explosive, thereby emitting high powered electrical energy, actively matching the load to slow the Treacle creating a shield, utilization of segments to power other segments or change the flux, or calling for external flux changes to maximize the desired effect.

These and additional features provided by the embodiments described herein will be more fully understood in view of the following detailed description, in conjunction with the drawings.

BRIEF DESCRIPTION OF DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 2A and 2A-1 schematically depict the Treacle and an exploded view of a device for determining the properties of a Treacle generated within a shock wave and modulating its kinetic energy according to one or more embodiments shown and described herein;

DETAILED DESCRIPTION OF DRAWINGS

Figure 1:
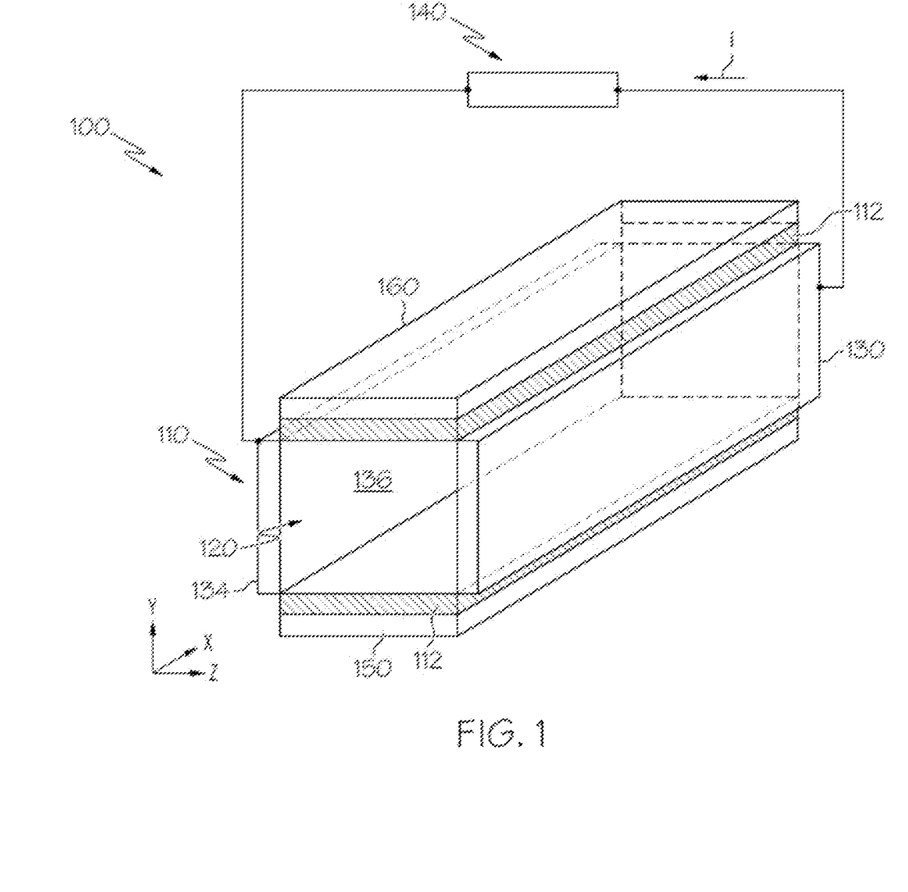
FIG. 1 schematically depicts a perspective view of a device for determining the properties of a Treacle formed within a shock wave and modulating its kinetic energy according to one or more embodiments shown and described herein.

FIG. 1 generally depicts one embodiment of a device for determining the properties of a Treacle generated from a shock wave's discontinuity with a high impedance electrical load and modulating its kinetic energy. The device generally comprises a channel enclosing a fluid, magnetic sources such as, for example, permanent magnets capable of producing up to 1 Tesla, electrodes such as, for example, high conductivity copper electrodes, and a high impedance electrical input load such as an oscilloscope or data recorder. Various embodiments of the device, as well as methods and systems for modulating kinetic energy from a Treacle contained within shock wave with an electrical load will be described in more detail herein.

Referring now to FIG. 1, an embodiment of a device 100 for determining the properties of a Treacle generated from a shock wave's discontinuity (not shown in FIG. 1) is depicted. The device 100 generally comprises a channel 110 enclosing a fluid 120, a north pole magnetic source 150, a south pole magnetic source 160, a high potential electrode 130, a low potential electrode 134, and an electrical load 140. It is noted that, while the electrical load 140 receiving current (i) is depicted as being connected to the high potential electrode 130 and the low potential electrode 134 at particular locations, the electrical load 140 may be connected to the high potential electrode 130 and the low potential electrode 134 at any location that provides for conductive coupling. That is, provided that the electrodes 130, 134 are conductively coupled, the specific spatial location of the conductive coupling is arbitrary. Furthermore it is noted that, while the north pole magnetic source 150, the south pole magnetic source 160, the high potential electrode 130, and the low potential electrode 134 are depicted as extending the full length of the channel 110, in the embodiments described herein the north pole magnetic source 150, the south pole magnetic source 160, the high potential electrode 130, and the low potential electrode 134 may each extend a partial length of the channel 110.

The channel 110 is a structure, tunnel, or adit that defines an outer boundary of an at least partially enclosed Treacle containing fluid 120 and constrains the motion of the fluid 120 such that the motion can be guided along one direction. In one embodiment, the channel 110 comprises a rectangular cross-section that is formed by insulators 112, a high potential electrode 130 and a low potential electrode 134. The structure, tunnel, or adit, normally considered man-made objects does include biological meatus channels such as the one leading to the human eardrum, or the input to the chest cavity housing the human lung. Therefore, it is noted that the channel 110 may comprise any shape as a cross-section such as, for example, a circle, an oval, a polygon, a natural shape, or an irregular shape. Additionally it is noted, the channel 110 is generally depicted in FIGS. 1-2B and 4-5 as comprising a constant cross-section for clarity and not by limitation. Thus, the channel 110 may comprise a varying cross-section that, according to the specific aerodynamic properties the varying cross-section, will enhance determination of the properties of a Treacle generated within a shock wave. The channel 110 may be formed or consist of any material that can or is configured to maintain substantially constant dimensions when subjected to the traverse of a Treacle such as, for example, a metal, a hardwood, plastic, concrete, natural stone or biological tissue. For example, the channel 110 may withstand a shock wave containing Treacle traverse that is intentionally generated by an explosive energy and/or a Treacle traverse generated by an explosive energy that can be anticipated such as, but not limited to, a high density explosive within a metal tube, an explosive detonated in a subway tunnel by a terrorist, or an accidental detonation of an incendiary material in a mining tunnel. The channel 110 may be any length, or distance along the direction of propagation x, i.e., for rapid energy conversion the length may be on the order of about an inch and for slower energy conversion the length may be on the order of many feet or much larger. Furthermore, it is noted that any of the elements described herein may be disposed within the channel 110, rather than being integral with the channel 110.

Furthermore, it is noted that the channel 110, as described herein, may be formed of any of the elements described herein that are capable of forming a fluidic boundary that is robust enough to contain and allow for the propagation of a Treacle within the bounded fluid. Therefore, by maintaining "substantially constant dimensions," the channel is rigid enough to collimate the Treacle. Collimation assists in the transformation of the Treacle to electrical energy by maintaining the Treacle energy within the shock front while it passes through a magnetic field. For the purpose of defining and describing the present disclosure, it is noted that the term "fluid" as used herein means a liquid of gas containing a mass slug (Treacle), that is capable of flowing and that changes its shape when acted upon by a force tending to change its shape.

Figures 2A, 2A:
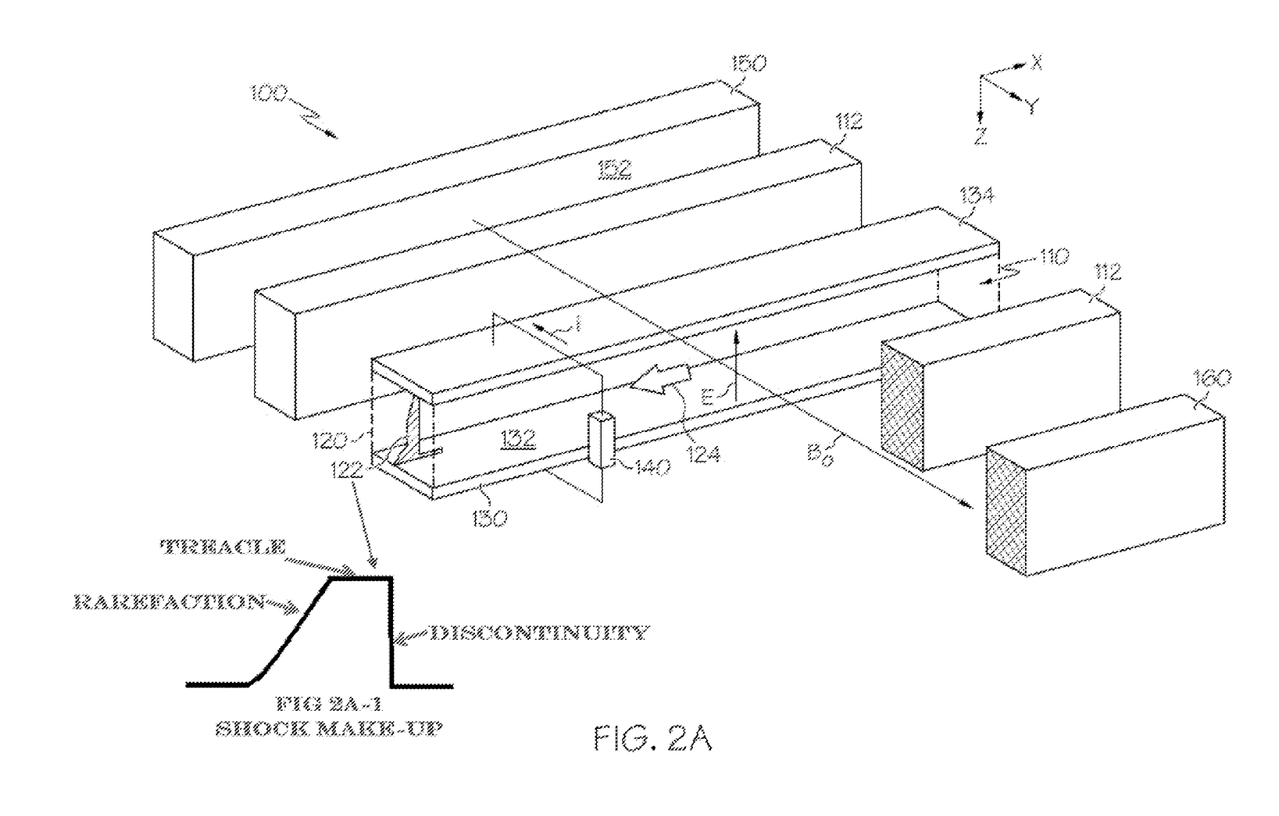

The magnetic sources 150, 160 generate magnetic fields across the fluid 120. Referring now to FIG. 2A, in one embodiment of the device 100, the north pole magnetic source 150 and the south pole magnetic source 160 are disposed on opposite sides of the channel 110. The magnetic fields originate at the north pole magnetic source 150 and terminate at the south pole magnetic source 160. Therefore, a magnetic flux density $B_0$ can impinge on the fluid 120 when the Treacle within 122 is disposed between the magnetic sources 150,160. The magnetic sources 150,160 may be permanent magnets, electromagnets, or a combination thereof. As used herein, the term "permanent magnet" means a magnetized object that generates a persistent magnetic field. The term "electromagnet," as used herein, means an electrically powered object that generates a magnetic field in relation to the amount of power consumed by the object.

Figure 2B:
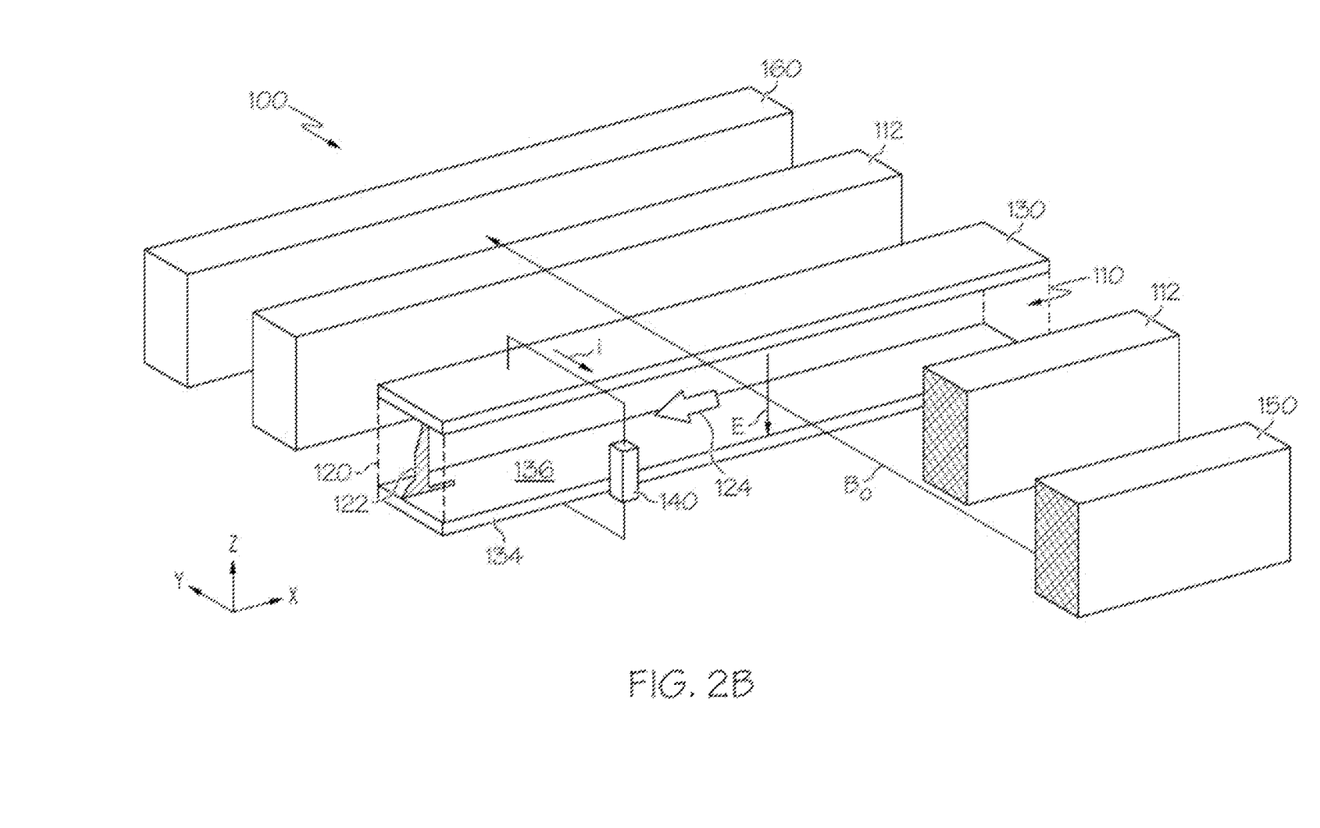
FIG. 2B schematically depicts an exploded view of a device for determining the properties of a Treacle generated from a shock wave and modulating its kinetic energy according to one or more embodiments shown and described herein.

Referring now to FIGS. 2A, 2A-1 and 2B, the electrodes 130,134 are conductive objects capable of maintaining electrical surface charges. In one embodiment, an externally generated electric field E is transmitted across the fluid 120 from an initiation surface 132 of the high potential electrode 130 to a termination surface 136 of the low potential electrode 134 for the purpose of differencing the Treacle properties determination algorithm or accelerate or decelerate the Treacle based on a priori knowledge of Treacle properties. The electrodes 130,134 may comprise any material suitable for conducting electricity, such as copper, gold or any known or yet to be discovered conductive material. The electrodes 130,134 may also comprise any shape such that they are configured to make electrical contact with the fluid 120. While the high potential electrode 130 and the low potential electrode 134 are depicted as rectangular plates, the electrodes 130,134 may comprise any other shape that does not interfere with the magnetic flux density $B_0$ and provides electrical contact between a surface of the electrodes 130,134 and the fluid 120 such as, for example, a curved plate, a disk, a sheet, a sphere and the like. Thus, the electrodes 130,134 need not be identical and/or parallel.

Referring again to FIG. 1, any electrical load to include an infinite resistance (open circuit) 140 may be used to determine Treacle properties by receiving electrical current i from the high potential electrode 130 and the low potential electrode 134. Specifically, in one embodiment the electrical load 140 is conductively coupled to the high potential electrode 130 and the low potential electrode 134. The electrical load 140 may comprise any type of electrical circuit that transfers energy to do mechanical, electrical, electromagnetic, acoustic or thermodynamic work. Therefore, the electrical load 140 may convert electrical energy into various forms such as, for example, heat, light, motion, sound or electromagnetic fields. It is noted that the term "conductively coupled," as used herein, means electrical communication via a conductive mechanism such as for example, terminal blocks, posts, solder joints, integrated circuit traces, wires, and the like. Determination of the Treacle properties in this method take the form of identifying the Alfén wave contribution to the electrical circuit used to transfer energy.

Figure 3:
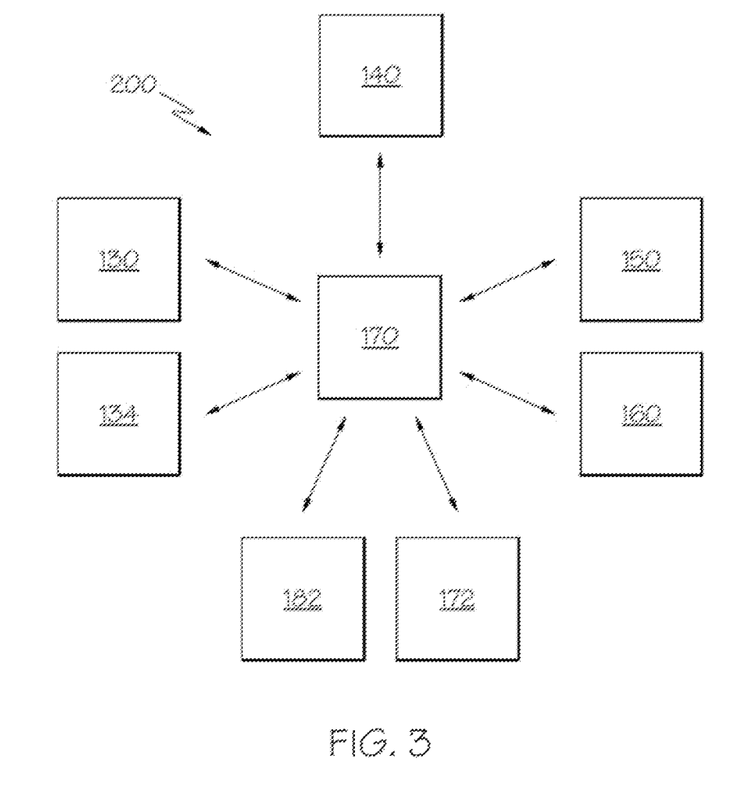
FIG. 3 schematically depicts a system for determining the properties of a Treacle generated from a shock wave and modulating its kinetic energy according to one or more embodiments shown and described herein.

Referring now to FIG. 3, an embodiment of a system 200 for determining Treacle properties and modulating kinetic energy from a Treacle mass slug within 122 (FIG. 2A-1) with an electrical load 140 is schematically depicted. In one embodiment, the system 200 comprises a plurality of modules that are communicatively coupled to the electronic control unit 170. Specifically, the electronic control unit 170 may be coupled to the high potential electrode 130, the low potential electrode 134, the electrical load 140, the north pole magnetic source 150, the south pole magnetic source 160, a shock sensor 172, and a detonator 182. Embodiments of the system 200, described herein, may include all or some of the modules. The modules not previously described will be described in further detail hereinafter.

The electronic control unit 170 comprises a processor for executing machine readable instructions and a memory for electronically storing machine readable instructions and machine readable information. The processor may be an integrated circuit, a microchip, a computer or any other computing device capable of executing machine readable instructions. The memory may be RAM, ROM, a flash memory, a hard drive, or any device capable of storing machine readable instructions. In the embodiments described herein, the processor and the memory are integral with the electronic control unit 170. However, it is noted that the processor and the memory may be discrete components communicatively coupled to one another such as, for example, modules distributed throughout the system 200 without departing from the scope of the present disclosure. Furthermore, it is noted that the phrase "communicatively coupled," as used herein, means that components are capable of transmitting data signals with one another such as, for example, electrical signals via a conductive medium, electromagnetic signals via air, optical signals via optical waveguides and the like.

The Treacle/shock sensor 172 is an item 100 standalone demodulator of the information from item 140 with an item 170 electronic control unit for running the Treacle algorithm thereby determining Treacle properties and transmits a signal indicative of the shock or explosion to the electronic control unit 170. In one embodiment the shock sensor is integral to unit 170 and operates internally via software on the information received from 140 as interpreted by the algorithm thereby sensing the indicia. For example, the shock sensor 172 may sense an overpressure and transmit information indicative of the overpressure to the electronic control unit 170. Embodiments of the shock sensor 172 may measure indicia of an explosively formed Treacle within the shock such as, for example, pressure, density, velocity, conductivity, and the like. It is noted that the term "sensor," as used herein, means a device that measures a physical quantity and converts it into an electrical signal, which is correlated to the measured value of the physical quantity, such as, for example a transducer, a transmitter, an indicator, a piezometer, a manometer, an accelerometer, and the like. Further-more, the term "signal" means an electrical waveform, such as DC, AC, sinusoidal-wave, triangular-wave, square-wave, and the like, capable of traveling along a conductive medium.

Figure 5:
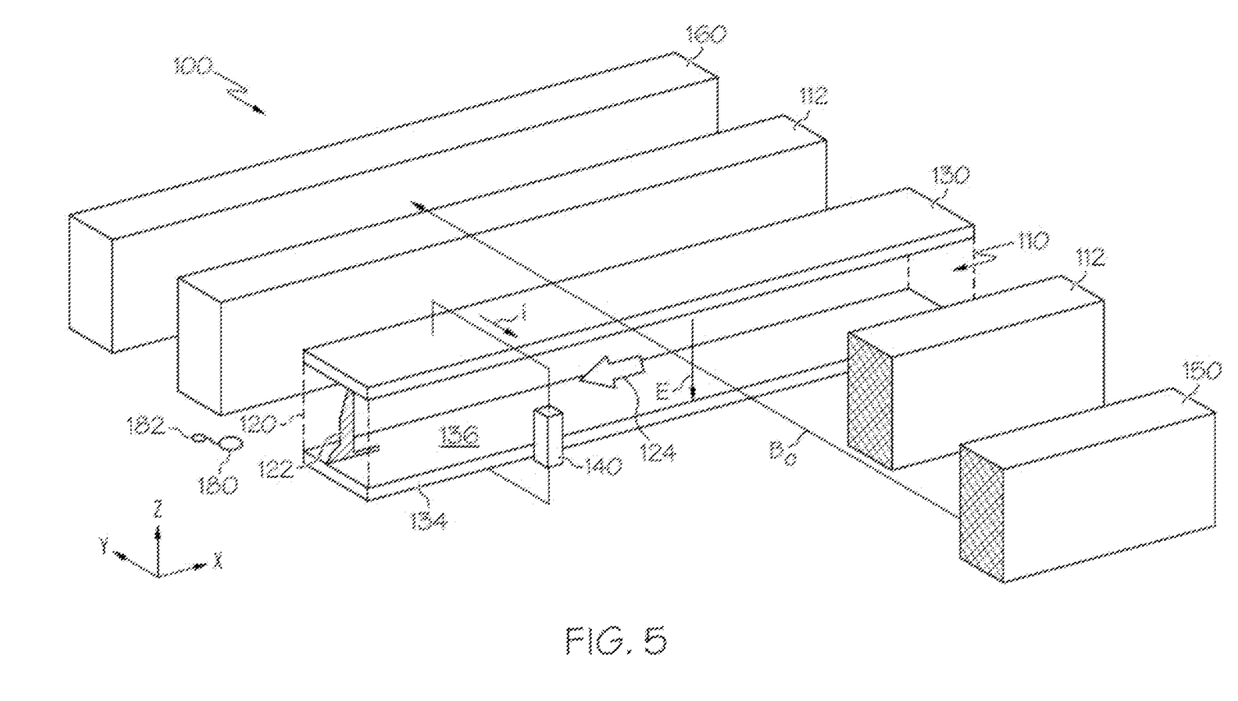
FIG. 5 schematically depicts an exploded view of a device for determining the properties of a Treacle generated from a shock wave and modulating its kinetic energy according to one or more embodiments shown and described herein.

Referring now to FIG. 5, the detonator 182 is a device that comprises a chemical, mechanical, or electrical mechanism for triggering the explosion of the explosive 180. The explosive 180 (FIG. 5) is a substance that comprises stored energy that may produce a rapid expansion of gas detonation products accompanied by the production of light, heat, pressure, a shock discontinuity, and combinations thereof. A detonation velocity may be utilized to categorize the explosive 180. The detonation velocity is the velocity with which the explosive process propagates throughout the mass of the explosive 180. For example, mining explosives may have detonation velocities ranging from about 1,800 m/s to about 8,000 m/s. In some embodiments, the system 200 may comprise an explosive 180 with a known detonation velocity such as, but not limited to, a polymer bonded explosive (e.g., LX14 with a detonation velocity of about 9,000 m/s) or any other high density, high velocity material. In other embodiments, the system 200 may comprise an explosive 180 with an unknown detonation velocity. For example, an improvised explosive device (IED), comprising any pyrotechnic, incendiary, or explosive material, may be detonated as a result of rogue activity. Therefore, in the embodiments described herein, the explosive 180 may comprise any material capable of generating a Treacle formed in the reaction zone of a discontinuity shown in 122.

A Treacle within 122 will be generated by the detonation of the explosive 180. For example, the detonation may initiate a pressure that is greater than a hundred atmospheres and increase the temperature at the front rising edge to an ionizing temperature. This front rising edge is known as the discontinuity. The discontinuity pressure and the temperature serve as the reaction zone that cooperates with the conditions in front of the discontinuity to form the Treacle within 122. The discontinuity may be dense (on the order of about several hundred micrometers thick) and may travel along a direction of propagation x within a fluid 120 disposed within the channel 110 dragging the Treacle at a high velocity. The velocity is a function of the Treacle driving (dynamic) pressure (i.e., the higher the driving pressure, the higher the velocity) and may be from about 0.1 Mach to about 50 Mach for conventional explosives. However, it is noted that the embodiments described herein may operate with explosives generating higher driving pressures such as, for example, non-conventional explosives or explosions produced extra-terrestrially or with lower pressures and events of nature such as lightning strikes. As the shock wave 122 forms a pressure discontinuity, or shock front, the ionizing temperature forms a sheet-like ionized zone of several mean free paths of the detonation product wide at the shock front. This sheet like reaction zone breathes in the products in front of its travel ionizing and compressing the material into a slug which is on the order of 1 inch long. The newly ionized zone comprises free charge and forms a conductive zone mass slug known as the Treacle, and is analogous to a rigid conductor traveling with the shock wave discontinuity in 122 and shown in FIG. 2A-1. The system 200 therefore contains kinetic and electromagnetic field energy, which may be utilized to power an electrical load 140 according to the embodiments described herein.

A dissipating structure can be erected to dissipate Treacle energy created within 122 discontinuity relatively rapidly via the electrical load 140 when the channel length is relatively short such as a window well or a door frame or the auditory meatus channel of the human ear. Referring again to FIGS. 2A-B, the system 200 may comprise a channel 110 surrounding a fluid 120, insulators 112, a high potential electrode 130, a low potential electrode 134, an electrical load 140, a north pole magnetic source 150 and a south pole magnetic source 160. Specifically, in one embodiment, the high potential electrode 130 comprises an initiation surface 132 that is in fluidic communication with the fluid 120. The low potential electrode 134 comprises a termination surface 136 in fluidic communication with the fluid 120 and substantially parallel to the initiation surface 132. The electrical load 140 is conductively coupled to the high potential electrode 130 and the low potential electrode 134. The north pole magnetic source 150 is coupled to the channel 110 and comprises a flux directing surface 152 such that the magnetic flux direction y is substantially normal to the flux directing surface 152. The south pole magnetic source 160 is disposed across from and substantially parallel to the north pole magnetic source 150. The electrodes 130, 134 and the magnetic sources 150, 160 are electrically separated, so as not to short out the system, by insulators 112. The insulators 112 may comprise any volumetric shape. Additionally, it is noted that the term "insulator," as used herein, means a material that resists the flow of electric current and separates conductive materials such as, for example, air, a dielectric, concrete, glass, porcelain, polymers, and the like.

A magnetic flux density $B_0$ can be generated between north pole magnetic source 150 and a south pole magnetic source 160 to fill the portion in front of the Treacle within 122 to form a dissipating structure. As the ionized Treacle slug within 122 impinges on the magnetic flux density $B_0$ along the direction of propagation x, stored energy from the Treacle within 122 is converted to electrical pulse energy as an electric field density E. The electric field density E is generated along the electric field direction (depicted in FIGS. 2A and 2B as the negative z direction) and current i flows through the electrical load 140. The current i produces a Lorentz Force 124 that opposes the direction of propagation x and reduces the kinetic energy of the Treacle within 122. The Lorentz Force 124 and the current i flowing through the electrical load 140 reduces the driving pressure of the Treacle within 122 and the temperature of the Treacle within 122. As the Treacle within 122 progresses through the magnetic flux $B_0$ its energy is reduced until the Treacle approaches de-ionization. This energy reducing recombination of electrons and molecules reflects the temperature decrease and the system ultimately stalls no longer producing detectable usable energy. Only a minimum amount of conductivity need be present to maintain the system (less than about 100 mhos/meter); thus the magnetic flux density $B_0$, an externally applied electrical field, or device 100 geometry may be configured to stall (cease electrical generation) forcing the Treacle within 122 into a sub-lethal energy level.

Figure 7:
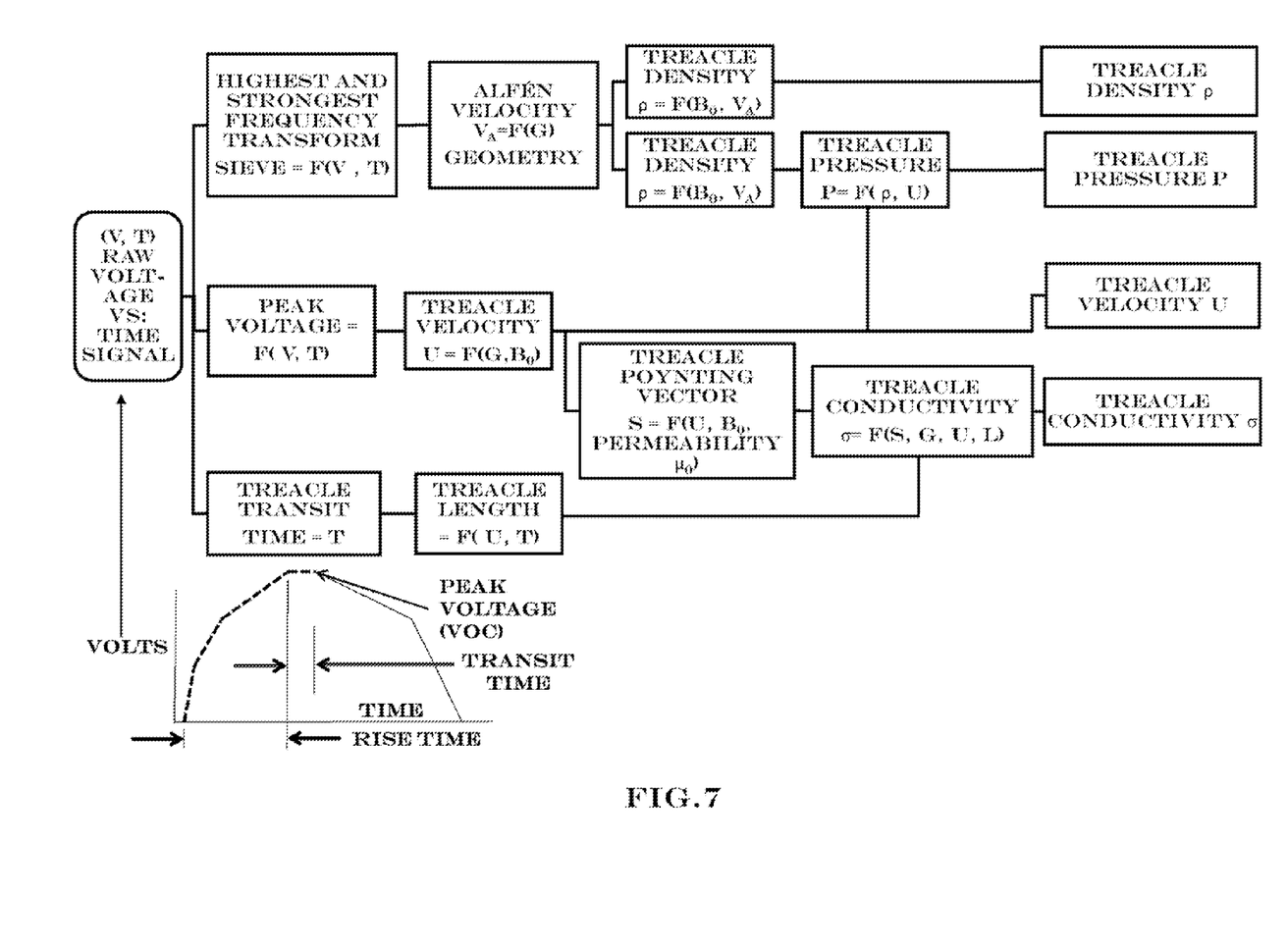
FIG. 7 graphically depicts the algorithm and signal processing means for determining the properties of a Treacle generated from a shock wave's discontinuity according to one or more embodiments shown and described herein.

An exemplary mathematical model and algorithm describing the conversion of the Treacle energy within 122 may be formulated by combining a model describing fluid dynamics with adjustments from a model describing electrodynamics. Specifically, the mathematical model may be utilized for analytic computations by considering: the conservation of mass, the conservation of momentum, the conservation of energy and the gas state equations. From the conservation of mass it may be inferred that the matter that goes into a plane fully exits the plane. From the conservation of momentum it may be inferred that the velocity drop and accompanying momentum change must be transferred to an electron particle and charged molecule. From the conservation of energy it may be inferred that the kinetic energy decrease as result of retardation of Treacle velocity must be made up by the increase in electrical and/or joule heating energy. And finally, the gas state equations provide a relationship between temperature, pressure and volume. Thusly, the mathematical model may be solved for pressure, temperature, velocity, conductivity, and density to provide a descriptive tool and algorithm regarding Treacle deceleration as a function of channel length or flow down a channel and determination of Treacle initial conditions, given boundary conditions. It is noted that the exemplary mathematical models described herein determine Treacle properties. Referring to FIG. 7 algorithm the open circuit voltage is measured via the load 140. This is done by an electrical voltage versus time measuring device with a high impedance that sifts the input and serves as the load 140 and measures open circuit voltage. Sifting is performed by utilizing the initial pulse's rise time and flat top (area of zero average slope) peak voltage only. The first operation is to measure the Treacle velocity. This is done by applying the peak open circuit voltage measurement amplitude to Magnetogasdynamics flow theory equations. The attention of the algorithm now turns to the pulse spectra (shown above the peak voltage measurement) which must contain the Alfén wave's frequency properties generated by the conductively homogeneous, on the average, Treacle. It is determined by sifting the highest and strongest component of the spectra determined by Fourier transform or other spectral determining circuits and/or algorithms. The Alfén wave's velocity which is current flow is then determined from geometry (G) as applied to Alfén wave theory. The Alfén velocity is the transport mechanism for charge to flow and be collected at the conductive terminals 130, 134. It is generated by the plucking of the magnetic field strings by the passing Treacle. It is a slow wave<<speed of light and only on the order of 100 meters/second. This slow wave allows trailing rarefaction products, as shown in FIG. 2A-1, to pluck the field and generate other frequencies contaminating the spectra of the measured pulse. The Treacle is and must be the strongest and highest component in the spectra. The density of the Treacle is then determined from Alfén theory and this density input to the dynamic pressure equation to determine dynamic driving pressure. The length of the Treacle mass slug is determined by measuring the time duration of the pulse's peak flat-top. When multiplied by the Treacle velocity the measurement yields the length of the Treacle slug. Further the impulse is determined by multiplying the Treacle density by the Treacle velocity and dividing by the Treacle slug length. More importantly the conductivity of the Treacle slug is determined by dividing the power, as determined by the Poynting vector for a non-magnetic media and described by the permeability constant $\mu_0$, contained in the Treacle by the Treacle length as indicated. This determination of the conductivity allows determination of circuit current and by Ohms Law the internal resistance of the Treacle. Knowing the internal resistance a matched load case can be set by 170 downstream allowing the operating point to be set and the system stalled as discussed in Paragraph 0032.

The stall point, or critical velocity, is a free variable that sets a threshold velocity at which the Treacle within 122 must traverse along the direction of propagation x in order to generate electricity from the Treacle within 122 via the electrical load 140. The critical velocity is a term that is equal to the ratio of the electric field density E to the magnetic flux density $B_0$:

$$\text{Critical Velocity} = E/B_0$$

Figure 4:
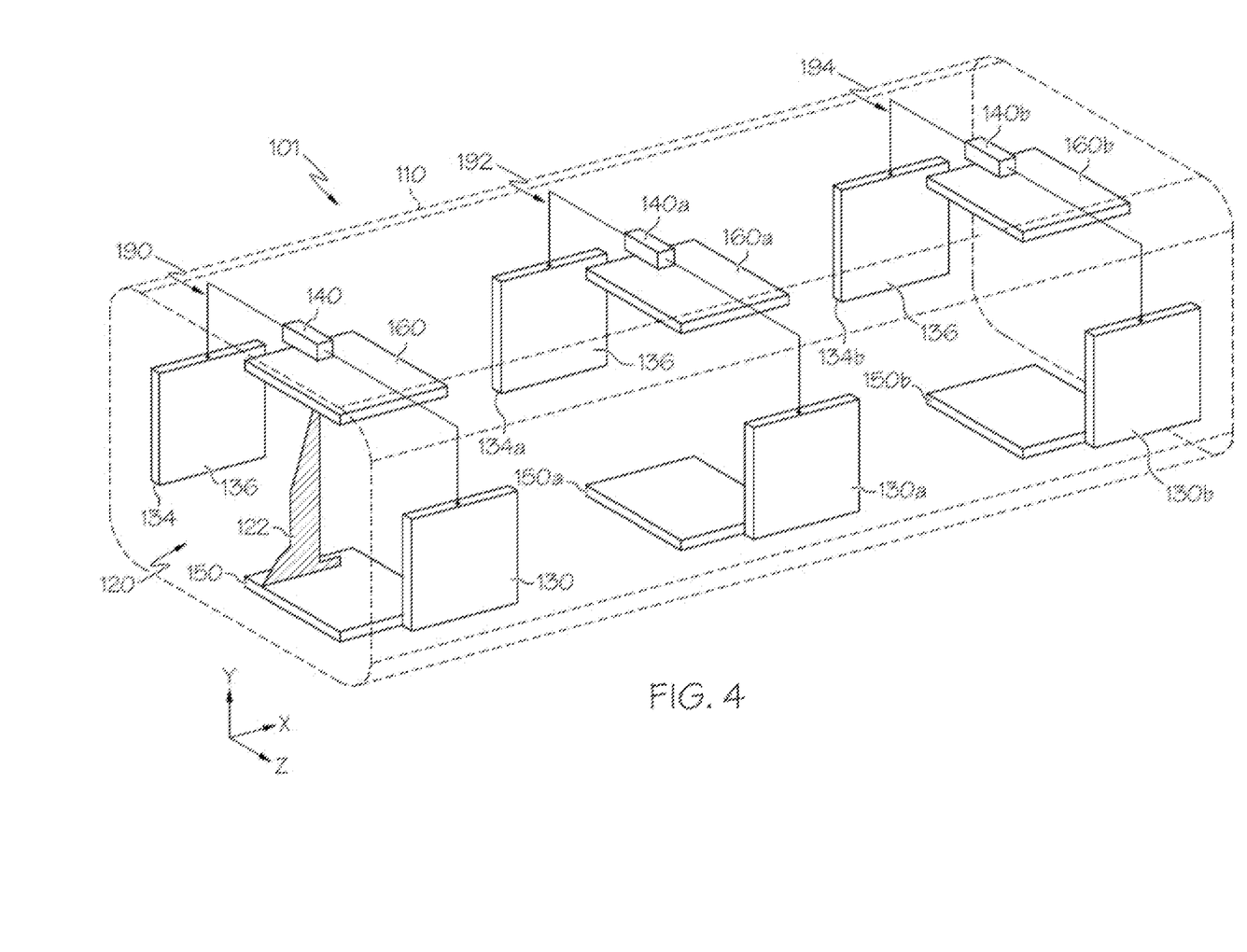
FIG. 4 schematically depicts a perspective view of a segmented device for determining the properties of a Treacle generated from a shock wave and modulating its kinetic energy according to one or more embodiments shown and described herein.

The system operating point (how much velocity is dropped during Treacle progress) can be set in accordance with the Treacle conductivity, determined by the algorithm, to eliminate an ionized Treacle or decrease the Treacle pulse amplitude or provide a constant pulse amplitude down the channel during progress through the segmented configuration shown in FIG. 4.

Therefore, the critical velocity may be set by modifying the magnetic flux $B_0$ of the system in accordance with the electric field density E and the system operating point in accordance with the Treacle conductivity. In one embodiment, the electric field density E may be sensed or calculated real time and it or the magnetic flux can be altered via, for example, modifying the current supplied to an electromagnet or external application of electric flux. In another embodiment, the critical velocity may be designed into the physical dimensions, G, of the system (e.g., adjusting the spacing of the electrodes 130, 134), the energy level of the explosion, or combinations thereof. Furthermore, it is noted that while the embodiments described herein are provided in relation to an x-y-z coordinate system, the arrangement of the elements of the embodiments described herein are to be interpreted as arranged in relation to one another and not to any fixed coordinate system.

A dissipating structure may be utilized as a reusable magnetic blast shield that protects assets from the deleterious effects of shock waves and accompanying Treacle. For example, if a rogue explosive event such as, but not limited to, the detonation of an IED occurs within a subway tunnel which acts as a channel 110, the shock sensor 172 will sense an over pressure or conductivity indicative of the presence of a Treacle within 122. The shock sensor 172 can transmit a signal indicative of the presence of the Treacle within 122 to the electronic control unit 170. Then, a magnetic flux density $B_0$ can be generated between north pole magnetic source 150 and a south pole magnetic source 160 away from the shock wave 122. Since this communication travels at the speed of light, the sensing of the shock wave 122 and initiation of the magnetic flux density $B_0$ occurs prior to any significant movement of the Treacle within 122 down the channel 110 and along the direction of propagation x. As the Treacle within 122 travels along the direction of propagation x and orthogonally intersects with the magnetic flux $B_0$, current flows through the electrical load 140 via the electrodes 130, 134. Kinetic energy is dissipated from the Treacle within 122 via a Lorentz Force 124 and electrical energy dissipated by the matched electrical load 140 as determined by the Treacle conductivity.

Additionally, since the Treacle within 122 maintains an ionized state due to the ionizing temperature, the Treacle will maintain its conductivity until its kinetic energy becomes sub-lethal, i.e. ionization is correlated with temperature and pressure of the shock wave which causes lethal effects for both personnel and equipment. A reduction in the shock front ionization has a commensurate reduction in lethality. Specifically, lack of ionization (i.e., stalling the system) is accompanied by reduction in dynamic driving pressure and temperature of the shock wave such that a human sub-lethal environment is created. For example, if a shock wave was generated by the detonation of an explosive in a subway tunnel, passengers in the tunnel would experience a very high wind, but not a collapse of their chest cavity, bursting of their ear drums or production of free radicals within their biological system.

In one embodiment of the device 101, depicted in FIG. 4, the electrical energy dissipation of the electrical load 140 may be accomplished by heat dissipation into a matched Treacle internal resistance. The electrodes 130,134 that collect charge and drain energy from the Treacle within 122 can be embedded plates installed in segments down the channel 110. For example, the embedded plates may be physically and electrically attached to reinforcing steel of a subway tunnel. The reinforcing steel acts as the electrical load 140, and operates as a resistor that converts electrical current into heat. Additional resistive loads can be created by utilizing conductive objects within the concrete structure of the tunnel such as, for example, mounting hardware, rebar, reinforcements, and the like. Due to the large volume of dense material within a subway tunnel such as, for example, concrete, a large amount of heat may be dissipated from the Treacle within 122. Therefore, a reusable magnetic blast shield may be formed to transform a destructive Treacle into a non-damaging event. Further embodiments may be installed in mining tunnels, window frames, door frames, or any other structure comprising a channel-like structure. At a much smaller scale this embodiment of FIG. 4 would apply to the external auditory meatus of the human biological system thereby eliminating or properly damping and removing the lethality to the ear drum, all while allowing normal hearing to be preserved since this is lethal pulse elimination not filtering or absorbing in ear plugs or muffs.

Figure 6:
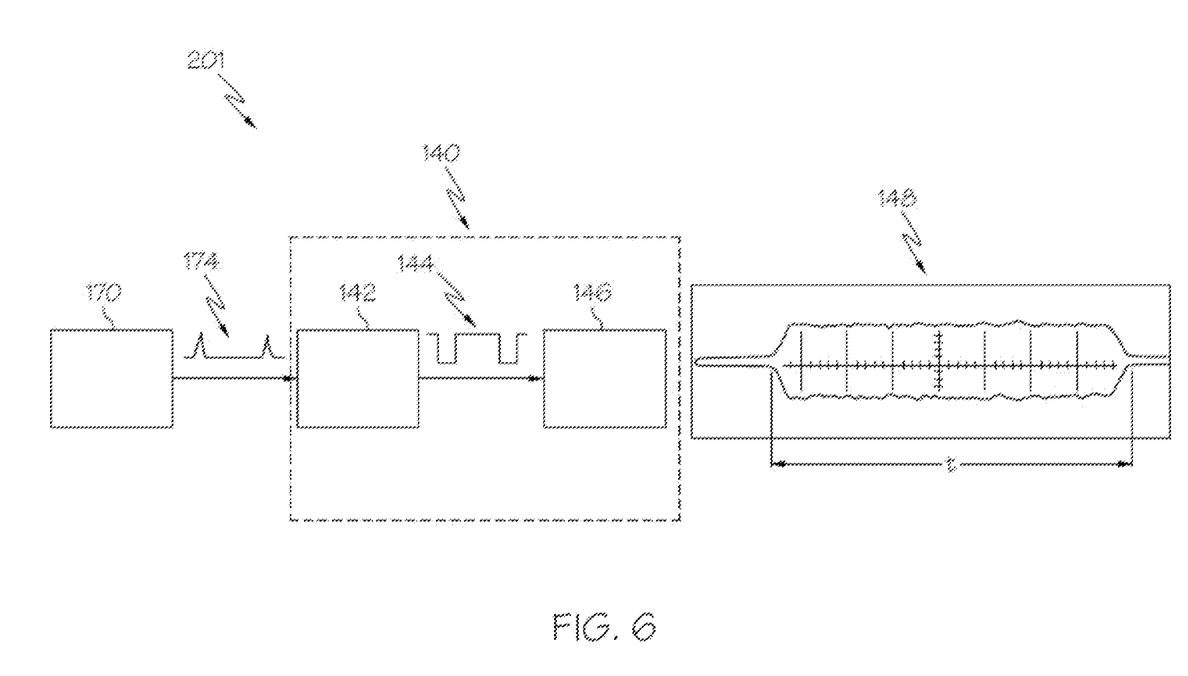
FIG. 6 schematically depicts a system for dissipating kinetic energy from a Treacle generated from a shock wave according to one or more embodiments shown and described herein.

In another embodiment and referring to FIG. 6, the electrical load 140 may comprise a circuit for generating an electromagnetic transmission. For example, the transmission power level can be scaled to the energy level of a Treacle/shock event giving instantaneous annunciation of rogue activity, and the level of threat. Since, the Treacle within 122 powers the transmission circuit, no additional power source is required to signal the occurrence of rogue activity.

Again referring to FIG. 4, permanent magnet seeds may be used in a device 101 that is segmented to feed energy to power other elements of the device 101. The device 101 may comprise multiple segments 190, 192, 194 each capable of reducing the kinetic energy of a Treacle within 122. The first segment 190 comprises electrodes 130, 134, magnetic sources 150, 160, and an electrical load 140. The second segment 192 comprises electrodes 130a, 134a, magnetic sources 150a, 160a, and an electrical load 140a. The third segment 194 comprises electrodes 130b, 134b, magnetic sources 150b, 160b, and an electrical load 140b. For example, the first segment 190 may comprise an electrical load 140 conductively coupled to the north pole magnetic source 150a of the second segment 192, the south pole magnetic source 160a of the second segment 192 or a combination thereof. As the Treacle within 122 travels along the direction of propagation x, the Treacle traverses the first segment 190 and then the second segment 192. The electrical load 140 of the first segment 190 is powered as the ionized shock front passes over the magnetic sources 150, 160 of the first segment 190, which are permanent magnet seeds. The electrical load 140 may then power the magnetic sources 150a, 160a of the second segment 192 as the Treacle within 122 traverses the second segment 192. Similarly, the electrical load 140 may also be conductively coupled to the north pole magnetic source 150b of the third segment 194, the south pole magnetic source 160b of the third segment 194 or a combination thereof. Thusly, permanent magnets may be used as seeds to power the magnetic sources 150a, 160a, 150b, 160b of other segments either alone or in combination. Further embodiments of the device 101 may comprise any number of segments, and any type of electrical load 140 described herein. Therefore, it is contemplated that a single segmented device may convert the kinetic energy of the Treacle within 122 into multiple types of energies.

Referring now to FIG. 4-6, embodiments of the device 100 may comprise a detonator 182 coupled to an explosive 180 for generating electrical power for high power directed energy transmissions. The high power directed energy transmission, Item 148, may be high powered microwaves, x-rays, sonar, lasers, emergency communication systems, or any other electrically powered transmission disposed within the electrical load 140. Any of the high power directed energy transmissions can be powered by a shock Treacle once the internal resistance is known and the operating point dynamically set so pulses can be replicated as the Treacle within 122 passes through multiple segments of FIG. 4 impinging upon a magnetic flux density $B_0$, as described hereinabove.

Figure 8:
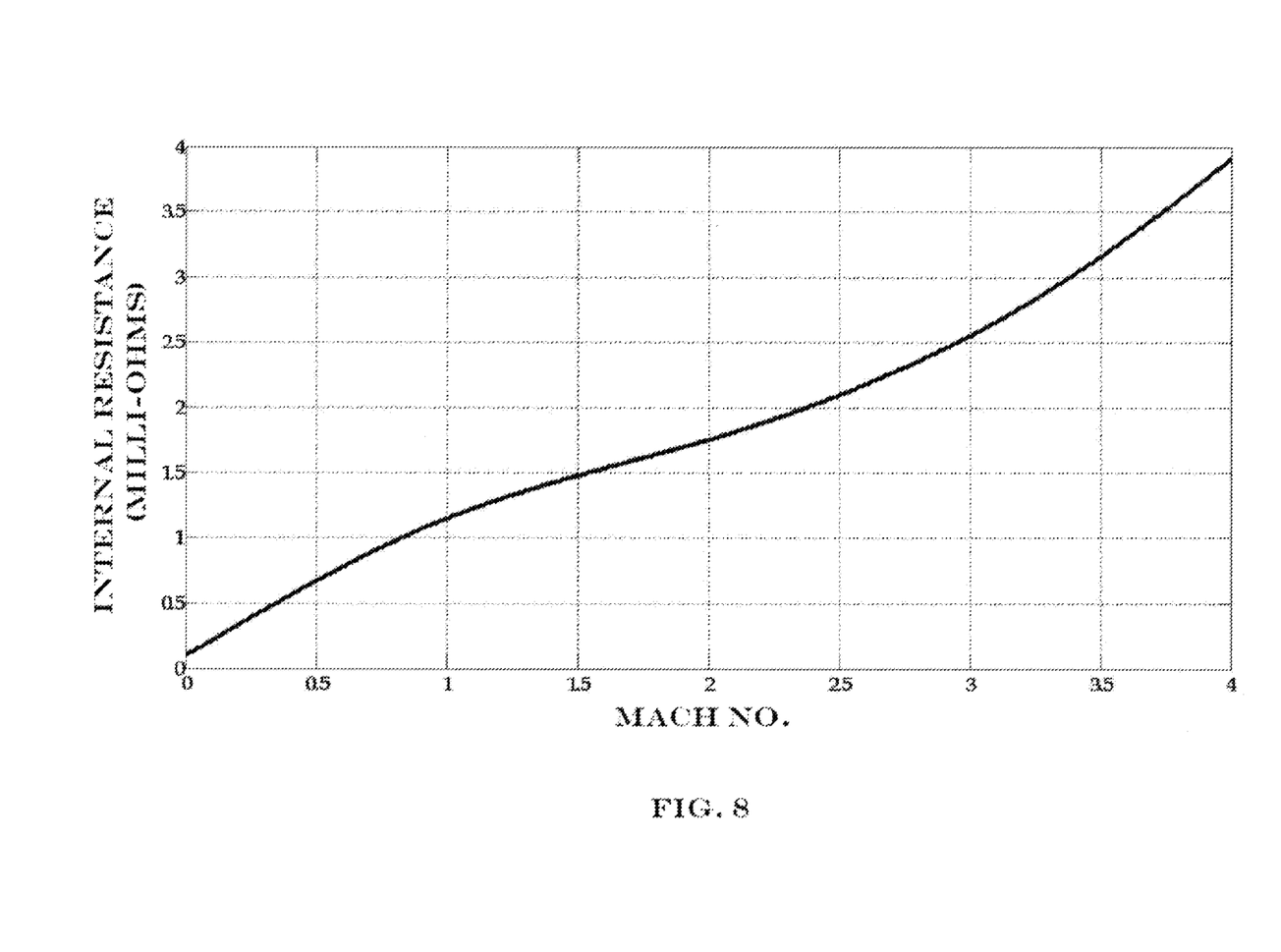
FIG. 8 graphically depicts empirical confirmation of an exemplary mathematical model for determining the properties of a Treacle generated within a shock wave.

The embodiments described herein will be further clarified by the following example:

The embodiments described herein were tested against theoretical solutions to Treacles propagating in a one-dimensional channel of nearly constant area, and against the solutions of Alfén and Newton. This allowed for the exploration of the Treacle structure and the extent of the effect of the electromagnetic field on the velocity and dynamic pressure driving Treacles made up of the same gas species. The Treacle dynamic properties were computed at the input to a slit channel with substantially constant dimensions from several events. The system was analytically formulated by the partial differential equations of conservation of mass, momentum and energy. The state laws were utilized to close the system so that the number of variables equaled the number of equations. Pressure gages were placed next to the slits to confirm the Treacle solutions. Independent shock field calculations were used to verify impulse. The results expressed as Treacle electrical internal resistance versus Mach number are summarized in FIG. 8.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Furthermore, these terms are also utilized herein to represent the degree by which a quantitative representation may vary from a stated reference due to manufacturing tolerances or fabrication tolerances.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An algorithmic method of determining a real time for the dynamic pressure, density, velocity, length, conductivity, and impulse of a Treacle formed in the reaction zone of a shock wave, the method comprising the steps of:

Applying a magnetic flux across a Treacle disposed within a channel, wherein the channel comprises substantially constant dimensions as the Treacle propagates through the channel;

Transforming kinetic energy from the Treacle into electrical energy;

Applying a high potential electrode to the electrical energy;

Applying a low potential electrode to the electrical energy; and

Coupling an electrical load conductively with the high potential electrode and the low potential electrode to dissipate the kinetic energy from the Treacle; said coupling step further comprising the steps of:

Measuring electrical voltage versus time of Treacle output into an open circuit or load;

Sifting an initial pulse;

Measuring the initial pulse's open circuit peak voltage;

Determining the Treacle velocity from the known geometry of the channel and the applied magnetic field;

Determining the spectral content of the sifted pulse;

Identifying the Alfvén magnetic wave velocity utilizing the highest and strongest spectral component measured;

Determining Treacle density from the Alfvén wave velocity;

Determining Treacle dynamic pressure by applying the density and velocity results to the dynamic pressure equation of Newton;

Measuring the time duration of the sifted pulse's peak voltage flat-top which is duration of average zero slope at the peak of the signal;

Determining the Treacle length by multiplying the time duration by the Treacle velocity;

Determining the power contained in the Treacle by application of the electromagnetic Poynting vector relationship for a non-magnetic Treacle media and the channel geometry;

Dividing the Treacle power by the Treacle length to yield conductivity of the Treacle; and Determining the Treacle's impulse by multiplying Treacle density by Treacle velocity and dividing by the Treacle length.

* * * * *